United States Patent Office 3,784,518
Patented Jan. 8, 1974

3,784,518
METHOD FOR PRODUCING ALKYL IODIDES
Frank E. Paulik, St. Louis, Mo., assignor to Monsanto Company, St. Louis, Mo.
No Drawing. Filed Sept. 29, 1972, Ser. No. 293,602
Int. Cl. C07c 19/00
U.S. Cl. 260—65 F  11 Claims

ABSTRACT OF THE DISCLOSURE

Alkyl iodides in which the alkyl group contains from 1 to 6 carbon atoms are prepared by reacting hydrogen, iodine and the corresponding alkanol at a temperature from about 25° to about 150° C. and a pressure from about atmospheric to about 500 p.s.i.g. in contact with a catalyst composition comprising metallic rhodium, ruthenium or iridium or the iodides of these metals supported on an inert material.

BACKGROUND OF THE INVENTION

The present invention relates to an improved process for the production of hydrogen iodide or alkyl iodides.

A demand for hydrogen iodide (HI) has been created by a process which has recently been developed for the preparation of carboxylic acids and esters by the reaction of an alcohol or an ester, or ether and halide derivatives thereof, with carbon monoxide in contact with catalyst systems formed on mixing of a rhodium component and an iodine component in the presence of carbon monoxide (CO). HI or methyl iodide ($CH_3I$) is usually employed as the iodine component in the manufacture of the catalyst used in this process. Although a well known inorganic acid recognized as having considerable utility as a catalyst, starting or intermediate material in many reactions, HI has not achieved any great measure of commercial utilization. It is, therefore, not available in any appreciable quantities and economically expensive methods are employed for its production. Aqueous HI is usually prepared commercially by reducing an aqueous iodine slurry with hydrogen sulfide. Even reagent-grade material normally is contaminated with residual hydrogen sulfide which can easily become an impurity in the end product of any process in which the HI is employed. Anhydrous HI can be produced by the direct reaction of iodine vapor with hydrogen over a platinum catalyst at elevated temperatures. This method provides HI of high purity but the reaction is slow, conversion is not complete and yields of the desired product are consequently low.

Alkyl iodides can also be employed in the preparation of the catalyst for the carboxylic acid manufacturing process mentioned above and methyl iodide has, in fact, come to be preferred over HI because it is less corrosive and easier to store. However, like HI, it is expensive and not readily available in quantity.

Accordingly, it is an object of the invention to provide an improved method for the production of HI of high purity which is both efficient and economical. It is another object of the invention to provide a method whereby either of the iodine-containing compounds, i.e., aqueous HI or alkyl iodides can be prepared at will from hydrogen and iodine. It is a still further object of the invention to provide an improved catalyst method for the direct reaction of hydrogen and iodine to produce HI at low pressures and high rates.

SUMMARY OF THE INVENTION

According to the present invention, HI is prepared by reacting hydrogen and iodine at temperatures from about 25° to about 150° C. and pressures from about atmospheric to 500 p.s.i.g. in contact with a catalyst composition comprising a metallic component which is either rhodium, ruthenium or iridium metal or the iodides of these metals supported on an inert material. Aqueous HI is prepared by conducting the reaction in water as the reaction medium. If an alkyl iodide is desired as the product, the corresponding alkanol is employed instead of water as the reaction medium or, alternatively, the reaction can be conducted if desired in a mixture of the alcohol and water.

DESCRIPTION OF THE PREFERRED EMBODIMENTS

Commercially available compositions containing 5% by weight of the catalytic metals specified above supported on charcoal are useful as catalysts. The preferred catalyst is rhodium supported on charcoal. However, other concentrations of any of the catalytic metals recited, namely, rhodium, ruthenium and iridium, on any inert solid contact material such as alumina, silica, silica-alumina, kieselguhr, kaolin and other clays and the like can be employed. The iodides of said metals can also be employed in lieu of the metals themselves on any of the aforementioned supports. Only small amounts of catalyst are required for practical reaction rates. Generally, an amount of catalyst to provide a metal concentration in the range from about 0.00001 mole to about 0.1 mole per mole of iodine charged can be used. Larger amounts can be employed, of course, but serve no useful purpose. Preferred amounts lie in the range between about 0.00001 to about 0.01 mole of metal per mole of iodine.

The process of the invention is preferably conducted at low temperatures. The reaction occurs at a substantial rate even at room temperatures. Suitable temperatures, in general, are in the range from about 25° to about 150° C. Preferably, a temperature from about 70° to about 125° C. is employed.

One of the advantages of the process of the invention is that it does not require high pressures. Good reaction rates can be maintained with pressures in the range from about atmospheric to about 500 p.s.i.g. Preferably, pressure is regulated in the range from about 25 to about 250 p.s.i.g.; especially preferred are pressures from about 50 to about 80 p.s.i.g.

In conducting the reaction, the water and iodine are mixed generally in at least a 2:1 molar ratio. Larger amounts of water can be employed to serve as a reaction medium if desired. Because of the limited solubility of the iodine in water, a small amount of aqueous HI may be added to dissolve the iodine and facilitate reaction. The addition of the HI is not necessary, however, since once the reaction is initiated, the HI required to effect further solubilization of the iodine in water is generated to sustain the reaction.

The hydrogen employed in the reaction can be the pure gas but it need not be. Hydrogen streams containing other components such as nitrogen, carbon monoxide, carbon dioxide, light hydrocarbons, etc., depending upon their source are also suitable in the process of the invention.

The reaction of hydrogen and iodine in an alkanol is essentially straightforward and proceeds under conditions similar to that of hydrogen and iodine in water at a good rate upon contacting of hydrogen gas with the catalyst slurried in a solution of the iodine and the alcohol. The alcohol is employed in excess of the stoichiometric amount required for the reaction to serve as the reaction medium when operating in the liquid phase. Water may also be employed along with the alcohol if desired. Suitable alcohols for use are the alkanols containing from 1 to 6 carobn atoms in the alkyl group from which alkyl iodides in which the alkyl group contains from 1 to 6 carbon atoms are produced.

The process is illustrated in the following examples which are not to be construed as limiting it in any manner whatsoever.

Example 1

A series of reactions were carried out between iodine and hydrogen in contact with a metallic catalyst consisting of rhodium supported on charcoal either in water or in an alkanol as the reaction medium. Magnetically-stirred, 250-ml., glass pressure bottles served as reactors. The reactors were placed in an electrically-heated, thermostatically-controlled, constant temperature oil bath. Constant reaction pressure was maintained by a Matheson low pressure regulator and the progress of the reaction was followed by a manual recording of the pressure drop on a fixed volume reservoir.

The water or alcohol (100 ml.) was purged with $H_2$ gas prior to mixing it in the reactor with weighed quantities of iodine and catalyst. When water was used, 24 ml. of 57% uninhibited aqueous HI was mixed with 76 ml. of water to dissolve the iodine. The reactor was then pressured to 50 p.s.i.g. and purged several times with $H_2$ to remove air. It was then vented to atmospheric pressure and placed in the constant temperature bath for 15 minutes to effect temperature equilibration. The reactor was then pressured to the desired level with hydrogen and the subsequent reduction of iodine was followed to completion. At the end of the reaction period the solution was colorless indicating total conversion of iodine.

Liquid samples were analyzed for HI by titration with $AgNO_3$ using an eosin yellow indicator. Alkyl iodides were identified both by mass spectrometric and gas chromatographic analysis using a Porapak T column and a Hewlett Packard Model 5750 chromatograph.

Conditions under which the reactions were conducted and results obtained are presented in Table I below. The activity of the catalyst is expressed as the average rate of consumption of iodine in g./l./hr. over the entire course of the reaction.

TABLE I

| Amount catalyst ×10⁻³ mole/l. | $I_2$, g./l. | Pressure, p.s.i.g. | Temp., °C | Reaction time, min. | Solvent | Average reaction rate, g. $I_2$/l./hr. |
|---|---|---|---|---|---|---|
| 2.5 | 254 | 80 | 90 | 55 | CH₃OH | 277 |
| 2.5 | 254 | 80 | 90 | 100 | C₂H₅OH | 152 |
| 1.25 | 127 | 80 | 50 | 240 | CH₃OH | 32 |
| 1.25 | 127 | 80 | 70 | 110 | CH₃OH | 69 |
| 1.25 | 127 | 80 | 90 | 60 | CH₃OH | 127 |
| 2.5 | 127 | 80 | 90 | 40 | CH₃OH | 191 |
| 1.25 | 127 | 80 | 90 | 60 | CH₃OH | 127 |
| 6.25 [1] | 127 | 80 | 90 | 100 | CH₃OH | 76 |
| 1.25 | 127 | 50 | 90 | 120 | CH₃OH | 64 |
| 1.25 | 127 | 65 | 90 | 70 | CH₃OH | 109 |
| 1.25 | 127 | 80 | 90 | 60 | CH₃OH | 127 |
| 1.25 | 63.5 | 80 | 90 | 25 | CH₃OH | 152 |
| 1.25 | 127 | 80 | 90 | 60 | CH₃OH | 127 |
| 1.25 | 254 | 80 | 90 | 140 | CH₃OH | 109 |
| 1 [2] | 254 | 80 | 90 | 180 | H₂O [3] | 85 |
| 2.5 | 128 | 60 | 100 | 195 | H₂O [3] | 40 |

[1] ×10⁻⁴.
[2] ×10⁻².
[3] 92 ml. H₂O plus 8 ml. 50% HI.

Example 2

The reaction between hydrogen and iodine in both water and methanol was carried out as described in Example 1 using as catalyst ruthenium metal supported on charcoal. Conditions under which the reactions were conducted and results obtained are presented in Table II.

TABLE II

| | Reaction 1 | Reaction 2 |
|---|---|---|
| Amount catalyst, mole/l. | 2.5×10⁻³ | 1×10⁻³ |
| $I_2$, g./l. | 254 | 254 |
| Pressure, p.s.i.g. | 80 | 80 |
| Temp., °C | 90 | 90 |
| Reaction time, min. | 195 | 240 |
| Solvent | CH₃OH | H₂O |
| Average reaction rate, g. $I_2$/l./hr. | 78 | 64 |

Example 3

Approximately 0.01 mole per liter of a catalyst consisting of iridium supported on charcoal is charged together with 25.4 g. of iodine, 92 ml. of water and 8 ml. of 50% HI to a reactor as described in Example 1. The reactor is then pressured to 50 p.s.i.g. and purged several times with $H_2$ to remove air. It is then vented to atmospheric pressure and placed in a constant temperature water bath for 15 minutes to bring the temperature of the contents to 90° C. Then $H_2$ is admitted to the reactor until a pressure of about 80 p.s.i.g. is attained. The subsequent reduction of iodine is followed to completion over a period of 180 minutes and an average reaction rate in g. $I_2$/l./hr. comparable to that obtained under similar conditions in Example 1 is obtained.

Although the foregoing description is largely directed to a liquid-phase batch process, it is obvious that the process can be operated on a continuous basis. Also, it is readily apparent that the process can be conducted in the vapor phase by mixing a stream of iodine vapor and a stream of hydrogen gas, and alcohol when the alkyl iodide is desired, and passing the mixture through a reaction zone packed with a bed of the catalyst maintained at the temperatures and pressures described above. Alternatively, a stream of hydrogen gas can be directed through a heated quantity of molten iodine and the resulting mixture of hydrogen and idoine vapor passed through the reaction zone. Use of a liquid reaction medium, however, is preferred.

Similarly, if iodides other than alkyl iodides are desired, the alkanols specified can be supplanted by aromatic alcohols such as benzyl alcohol and the like.

What is claimed is:

1. A process for producing alkyl iodides in which the alkyl group contains from 1 to 6 carbon atoms which comprises reacting hydrogen, iodine and the corresponding alkanol in which the alkyl group contains from 1 to 6 carbon atoms at a temperature from about 25° to about 150° C. and a pressure from about atmospheric to about 500 p.s.i.g. in contact with a catalyst composition comprising a metal component selected from the group consisting of rhodium, ruthenium and iridium and the iodides of said metals supported on an inert material.

2. A process for producing alkyl iodides in which the alkyl group contains from 1 to 6 carbon atoms which comprises reacting hydrogen and iodine in a liquid alkanol in which the alkyl group contains from 1 to 6 carbon atoms at a tempearture in the range from about 70° to about 125° C. and a pressure from about 25 to about 250 p.s.i.g. in contact with a catalyst composition comprising a metal component selected from the group consisting of rhodium, ruthenium and iridium and the iodides of said metals supported on an inert material.

3. The process of claim 1 wherein said inert material is charcoal.

4. The process of claim 2 wherein said inert material is charcoal.

5. The process of claim 4 wherein said pressure is in the range from about 50 to about 80 p.s.i.g.

6. The process of claim 5 wherein the amount of metal in said catalyst is in the range from about 0.00001 to about 0.1 mole per mole of iodine.

7. The process of claim 6 wherein said metal component is rhodium.

8. The process of claim 6 wherein said metal component is ruthenium.

9. The process of claim 6 wherein said metal component is iridium.

10. The process of claim 7 wherein said alcohol is methanol.

11. The process of claim 7 wherein said alcohol is ethanol.

References Cited
UNITED STATES PATENTS

| | | | |
|---|---|---|---|
| 1,950,827 | 3/1934 | Teypel et al. | 260—657 |
| 2,153,170 | 4/1939 | Buc et al. | 260—657 |
| 3,499,941 | 3/1970 | Givens et al. | 260—657 |

LEON ZITVER, Primary Examiner

J. H. REAMER, Assistant Examiner

U.S. Cl. X.R.

260—657; 423—487